(12) United States Patent
Schroeder et al.

(10) Patent No.: US 10,531,607 B2
(45) Date of Patent: Jan. 14, 2020

(54) HEADER LATERAL TILT CONTROL WITH AUTOMATIC OPERATION IN FREE FLOAT AND CONTROLLED TILT MODES

(71) Applicant: CNH America LLC, New Holland, PA (US)

(72) Inventors: Jay D. Schroeder, Coal Valley, IL (US); Vincent B. P. Theunynck, Izegem (BE)

(73) Assignee: CNH Industrial America LLC, New Holland, PA (US)

( * ) Notice: Subject to any disclaimer, the term of this patent is extended or adjusted under 35 U.S.C. 154(b) by 1055 days.

(21) Appl. No.: 13/955,931

(22) Filed: Jul. 31, 2013

(65) Prior Publication Data

US 2015/0033692 A1 Feb. 5, 2015

(51) Int. Cl.
*A01D 41/14* (2006.01)
*A01D 34/00* (2006.01)

(52) U.S. Cl.
CPC .................... *A01D 34/008* (2013.01)

(58) Field of Classification Search
CPC ............................ A01D 34/008; A01D 41/141
USPC .................. 56/10.2 E, 208, DIG. 15
See application file for complete search history.

(56) References Cited

U.S. PATENT DOCUMENTS

| | | |
|---|---|---|
| 2,750,727 A | 6/1956 | Wright |
| 3,566,587 A | 3/1971 | Janssen |
| 3,597,907 A | 8/1971 | Neal |
| 4,594,840 A | 6/1986 | D'Almeida et al. |
| 4,641,490 A * | 2/1987 | Wynn .................. A01D 41/145 56/10.2 E |
| 4,776,153 A * | 10/1988 | DePauw .............. A01D 41/145 56/10.2 E |
| 4,875,331 A * | 10/1989 | Ostrup .................. A01D 41/14 56/208 |
| 4,942,724 A | 7/1990 | Diekhans et al. |
| 5,359,836 A * | 11/1994 | Zeuner ................. A01D 41/141 56/10.2 E |
| 5,704,200 A | 1/1998 | Chmielewski, Jr. et al. |
| 5,713,190 A * | 2/1998 | Vermeulen ........... A01D 41/141 56/10.2 E |
| 6,119,442 A * | 9/2000 | Hale .................... A01D 41/127 56/10.2 H |
| 6,681,551 B1 * | 1/2004 | Sheidler ............. A01B 63/1006 56/10.2 G |

(Continued)

FOREIGN PATENT DOCUMENTS

EP 0149870 A1 7/1985
EP 2387870 A1 11/2011

*Primary Examiner* — Thomas B Will
*Assistant Examiner* — Mai T Nguyen
(74) *Attorney, Agent, or Firm* — Peter K. Zacharias; Patrick M. Sheldrake

(57) ABSTRACT

A method and system for controlling lateral tilt of a header of an agricultural machine, uses gauge wheels or skids on lateral ends of the header in combination with operation in a free float mode for maintaining uniform cut height across the header, and automatically changes to a controlled tilt mode when one or more conditions for that mode is present. During operation in the controlled tilt mode, if a condition or conditions for free float is present, the system will operate in that mode. The system can also optionally damp relative up and down movements of the gauge wheels or skids and the header on each end, and can limit the tilt in the free float mode.

23 Claims, 5 Drawing Sheets

(56) References Cited

U.S. PATENT DOCUMENTS

| | | |
|---|---|---|
| 6,789,379 B2 | 9/2004 | Heidjann et al. |
| 7,540,129 B2 | 6/2009 | Kormann |
| 7,647,753 B2 | 1/2010 | Schlipf |
| 7,669,392 B2 * | 3/2010 | Ehrhart ................ A01D 34/283 56/10.2 E |
| 7,703,266 B2 * | 4/2010 | Fackler ................ A01D 41/145 56/10.2 E |
| 7,707,811 B1 * | 5/2010 | Strosser ................ A01D 41/141 56/10.2 E |
| 7,869,922 B2 * | 1/2011 | Otto ..................... A01D 41/141 56/10.2 E |
| 7,874,132 B2 * | 1/2011 | Sauerwein ........... A01D 41/141 56/10.2 E |
| 2006/0242935 A1 * | 11/2006 | Rayfield .............. A01D 41/141 56/10.2 E |
| 2007/0163220 A1 * | 7/2007 | Ehrhart ................ A01D 34/283 56/10.2 E |
| 2010/0287900 A1 * | 11/2010 | Ringwald ............. A01D 46/08 56/17.1 |

* cited by examiner

HEADER LATERAL TILT CONTROL WITH AUTOMATIC OPERATION IN FREE FLOAT AND CONTROLLED TILT MODES

TECHNICAL FIELD

The invention relates generally to a method and system for controlling lateral tilt of a header of an agricultural machine, which more particularly uses gauge wheels or skids in connection with lateral ends of the header in combination with automatic operation in a free float mode, having a capability to automatically change to a controlled tilt mode when one or more predetermined conditions for that mode are present, and to automatically change back to free float when a condition or conditions for that mode are present. As options, the degree of control in the controlled tilt mode can be variable, and relative up and down movements of the gauge wheels or skids and the header can be variably limited or actively or passively damped to provide desired uniformity of plant cut height.

BACKGROUND ART

Automatic systems for controlling lateral tilt and height of headers on a variety of agricultural machines and vehicles, particularly harvesting machines such as combines and windrowers, are well known. Such known systems typically utilize an electro-hydraulic or mechanical apparatus for controlling the lateral tilt, to maintain a desired uniform distance between the header and a ground surface therebelow without action by the operator.

As a representative example, some known systems utilize a mechanical linkage incorporating gauge wheels or skids. The gauge wheels or skids are set a fixed distance below the header cutting or gathering surface and the header is lowered to bring the wheels or skids into contact with the ground, allowing them to carry a portion of the header weight. Ground elevation changes are followed by the gauge wheels to raise and lower the ends of the header relative to the harvesting vehicle to maintain the uniform cut height.

Other known systems fix the header to the harvesting vehicle and rely on a lifting and tilting device on the vehicle and sensors in connection with a controller to control height and lateral tilt to maintain uniform cut height. However, these have been observed to have performance limitations at higher travel speeds and when used with wider headers, particularly response lag.

Still other known systems for controlling header height use changes in pressures to maintain uniform cut height. This type of system relies on some portion of the header weight to be carried by the ground. When the header bottom contacts an obstruction, if the terrain rises, or the ground carries more of the header weight, pressures in the lift circuit are lowered, which causes the control circuit to lift the header. However, the known systems of this type do not account for lateral tilting of the header.

An observed shortcoming of the known lateral tilt controls is slow response to changing terrain conditions at higher travel speeds when used on wider headers.

Therefore, what is sought is a manner of automatic lateral tilt control for headers of agricultural vehicles, particularly harvesting machines, which provides an accurate and responsive ability to maintain uniform cut height, particularly at high travel speeds and for wider headers.

SUMMARY OF THE INVENTION

What is provided is an automatic lateral tilt control system and method for headers of agricultural vehicles, particularly harvesting machines, which provides an accurate and responsive ability to maintain uniform cut height, particularly at high travel speeds and for wider headers.

According to a preferred aspect of the invention, the lateral tilt control is configured and operable in a tilt control mode to hold the header at varying lateral tilt angles relative to the harvesting machine responsive to at least one predetermined monitored or sensed condition, and in a free float mode wherein the control is bypassed to allow substantially free lateral tilting of the header. The invention uses gauge wheels or skids connected to opposite lateral ends of the header, respectively, configured and operable to contact and follow contours of a ground surface below the lateral ends as the header travels thereover. The gauge wheels or skids are connected to the header with apparatus or mechanisms which allow limited resilient upward and downward relative movements of the gauge wheels or skids and the lateral ends, respectively. In the free tilt mode, as the harvesting machine moves over a ground surface with the gauge wheels or skids in contact therewith, the lateral tilt control is bypassed to allow the header to substantially freely tilt laterally in either direction, as dictated by the ground surface contour following capability of the gauge wheels or skids, and the limited resilient relative movement allowed will damp rapid up and down movements resulting from travel over rough terrain, e.g., furrows, and the like while still providing a good terrain contour following capability. Because the tilt control is bypassed, any system lag, e.g., for sensing, processing, and responding to ground contour changes, is minimalized or non-existent.

According to another preferred aspect of the invention, during operation in the free float mode, the system monitors for the presence of at least one predetermined condition for operation in the tilt control mode. If the monitored condition or conditions is/are absent, operation in the free float mode is continued. If the monitored condition or conditions is/are present, the control will be activated (bypass discontinued) to operate in the tilt control mode to control angle of tilt of the header.

In the tilt control mode, a tilt control actuator, e.g., hydraulic cylinder, is controllably operated to tilt the header as required, responsive to one or more monitored or sensed conditions, e.g., header height, ground proximity, etc.

According to another preferred aspect of the invention, the at least one condition monitored when operating in the free tilt mode can be a value representative of a height of at least one of the lateral ends of the header. As representative non-limiting examples, a ground sensor on or near the associated end of the header, or a sensor in connection with the associated gauge wheel or skid, can be utilized to sense or determine this value. In this regard, a ground sensor will be advantageous for soft ground and mud conditions where the wheels or skids can sink in and a sensor in connection with the gauge wheel or skid, e.g., a linear position sensor operable for measuring length of a hydraulic cylinder, etc., a rotary position sensor, etc., will be less accurate. As another example, the condition can include a value representative of a difference between heights of the lateral ends of the header above the ground surface. In each instance, the monitored height or difference will indicate non-uniform cut height, that is, outside of a permissible or desired range, and the lateral tilt control will be responsively activated to automatically return the header to, and maintain the header within, the range.

According to another preferred aspect of the invention, the at least one monitored condition can include a value or values representative of weights or loads on the lateral ends of the header, respectively, or of a difference between the weights or loads acting on the ends of the header. In this regard, in the free tilt mode, since the header is able to substantially freely tilt, differences in weights exerted on the lateral ends will influence or affect a direction of tilt and can affect the amount of resilient relative movement of the respective ends of the header and the associated gauge wheel or skid, and thus provide an indicator of uneven heights and thus non-uniform cut. In this latter regard, the apparatus or mechanism providing the resiliency to the upward and downward movements will typically comprise a hydraulic accumulator, spring, or other biasing element that will be subject to varying load conditions in use, including from ground surface irregularities and variances in the amount and weight of cut plants carried on the associated end of the header, and can yield to either or both loading conditions (upward, resulting from a terrain rise, and/or downward resulting from a greater weight or load, so as to vary height of the associated end. In this latter regard, if an end of the header is lowered relative to the other end so as to cut the plants on the lowered end shorter, and if the header carries or collects the cut plants, the load or weight exerted by the carried plants will be correspondingly heavier on the lowered end, and can cause further lowering of that end. The present invention, by monitoring weights or loads on the ends of the header while operating in the free float mode, can sense this condition and activate the tilt control mode to correct it.

As another preferred aspect of the invention, both a height or heights, and weights or loads associated with the respective ends of the header can be monitored also to determine whether an out of range or undesired tilt condition exists, and if so, activate the tilt control.

As another preferred aspect of the invention, when in the tilt control mode, at least one condition for operation in the free float mode will be monitored, and if present, the control will deactivate or be bypassed to allow free float or substantially free float. As a non-limiting example, weight or loads on the ends of the header, or an imbalance or difference therebetween, can be used, because if there is a weight or load imbalance sufficient to cause the lowering of the heavier end of the header, a uniform cut will not be maintained or achieved if the tilt control were to be deactivated, and thus that condition can be used to continue operation in the tilt control mode. On the other hand, if no imbalance is present, the tilt control can be bypassed or deactivated to allow free float. In the above regards, a trend or history of the weight and/or height difference can be predictive of tilting and thus serve as the monitored condition.

As still other preferred aspects of the invention, the respective resiliencies of the apparatus or mechanisms connecting the gauge wheels or skids and the ends of the header can be individually varied, and the individual relative motions variably damped by an active or passive damping system, in a controlled manner. In this regard, an active damping circuit can be understood generally for the present purposes as a damping circuit that automatically adapts and optimizes the spring-damper characteristic during operation so that the suspension is optimally adjusted to the operating conditions (header weight, soil condition/unevenness, temperature changes, etc.). Operator sensitivity command can be part of the active control loop. A passive damping circuit, on the other hand, has fixed spring-damper characteristics or allows adjusting one or more parameters before operation (manually or automatically). In a passive system, there is no continuous condition monitoring and adjustment during operation. The variable damping can be achieved in a variety of manners, using a variety of variable resilient elements or devices, e.g., by varying pretension or spring rate of a spring, pressure in an associated accumulator, the size of an orifice in an adjustable choke valve of a hydraulic suspension circuit, or the like, responsive to the monitored condition or conditions, or to inputted operator commands, e.g., sensitivity command.

As a non-limiting example, if an end of the header is determined to be heavier and/or subject to a greater load or weight of cut plants, the resiliency of the associated apparatus or mechanism connecting the gauge wheel or skid can be reduced to effectively stiffen the response and reduce or even prevent resulting lowering of that end of the header. This can be advantageously applied to allow continued operation in the free float mode, or changing to that mode from the controlled float mode. Additionally or alternatively, for example, at high travel speeds relative motions of the gauge wheels or skids and the ends of the header can be damped as a function of the monitored condition or conditions, to enable smoothing rapid up and down movements of the header resulting from small and/or frequent terrain irregularities such as furrows and the like, to improve uniformity of the cut height and quality of the monitored conditions, e.g., reduce signal noise. This can be useful for damping up/down movements generally for header height control purposes also.

DETAILED DESCRIPTION OF THE INVENTION

Figure 1:
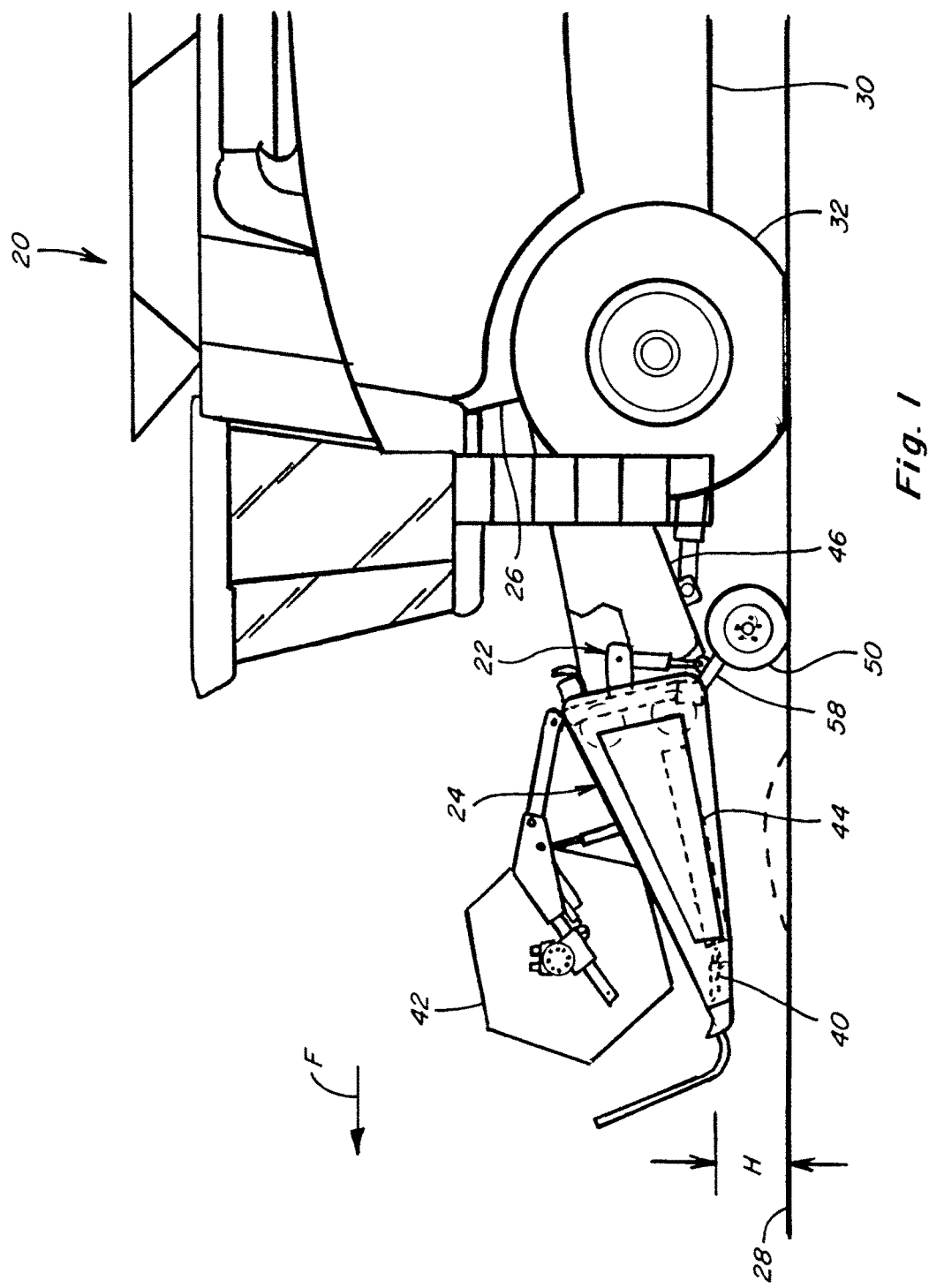
FIG. 1 is a fragmentary side view of the front end of a representative harvesting machine including a lateral tilt control automatically operable in free float and controlled tilt modes according to a system and method of the invention.
Figure 2:
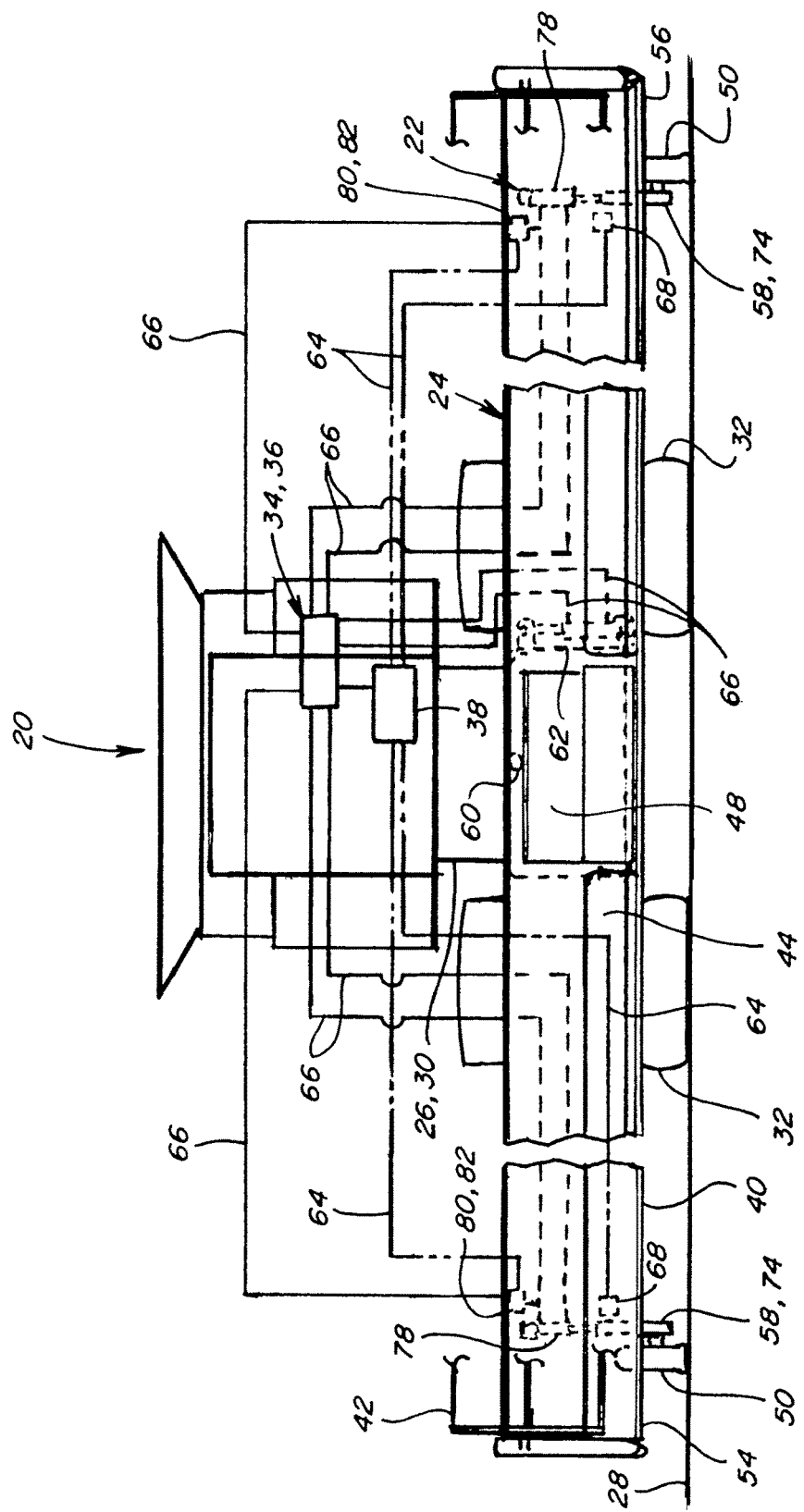
FIG. 2 is a simplified schematic front view of the harvesting machine of FIG. 1, showing aspects of the system of the invention.
Figure 3:
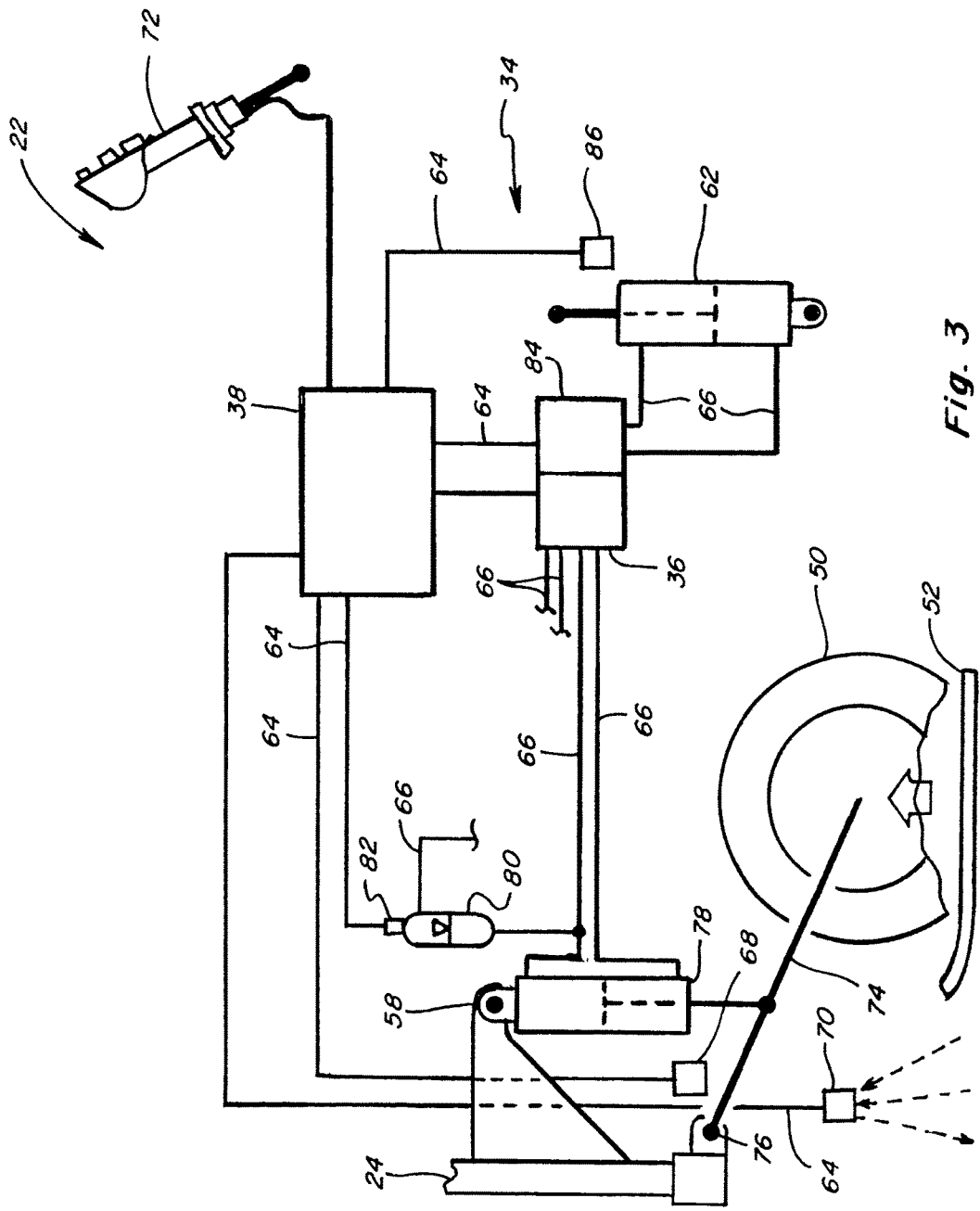
FIG. 3 is a diagrammatic representation of aspects of the system of the invention.

Referring now to the drawings, in FIGS. 1 and 2, a representative harvesting machine 20 is shown, including a lateral tilt control 22 operable according to a system and method of the invention for controlling lateral tilting of a header 24 carried on a front end 26 of machine 20, as machine 20 moves over a ground surface 28, as denoted by arrow F. Harvesting machine 20 is a typical, self-propelled combine harvester having a chassis 30 carrying a conventionally configured and operable engine and power train that drives tracks or wheels 32, and powers a pump of an electro-hydraulic system 34 including a valve block 36 including an array of valves controlled by a controller 38 for directing pressurized fluid to and from various locations for various purposes, in the well known manner. The engine also powers cutting apparatus 40 of header 24, which can comprise a conventionally configured and operable sickle cutter, disk cutters, or the like, as well as a reel 42, and gathering apparatus 44, which here is a draper belt system but could be an auger device, all of which are conventionally configured and operable.

A center region of header 24 is supported on machine 20 by a feeder 46, the front end of which is movable upwardly and downwardly relative to machine 20 for setting a cut height, denoted by height H in FIG. 1, at which plants will be cut from the ground. The cut plants will then fall onto a floor or pan of header 24, aided by reel 42, and pass onto gathering apparatus 44. The cut plants are then carried by apparatus 44 to an inlet opening 48 (FIG. 2.) of feeder 46, which will induct the cut plants and carry them internally therethrough into machine 20 for processing, all in the conventional, well known manner.

Height H can range from almost ground level, to several feet above ground surface 28. It is typically desired for height H to be at least generally uniform across the width of header 24, for various reasons, including for regulating the length of the cut plants, and thus the volume or rate thereof, inducted into and processed by machine 20. Uniformity may also be desired for leaving straw of height H on the field, for later cutting and collecting, or for soil retention, ground cover, and the like. A problem that arises, is that the height H may not be uniform across the width of header 24, for several reasons, including that the elevation of ground surface 28 can vary significantly across the width of header 24, which can be 40 feet or more. Elevational differences can be significant enough that contact with the cutting apparatus and damage can occur. To reduce occurrences of such problems, it is a common practice to provide the ability to laterally tilt the header. This is typically done using lateral tilt control systems such as discussed under the Background Art section above, and can take a variety of forms. As noted above though, shortcomings of known lateral tilt control systems include slower than desired response to terrain contours and other factors, resulting in unsatisfactory cut height across the width of the header, and in some instances, damage to the header, so that existing systems still do not satisfactorily solve the problems. Lateral tilt control 22 illustrated is configured and operable according to the system and method of the invention, to overcome the shortcomings of the known tilt control systems.

Referring also to FIGS. 3, 4, 5, and 6, lateral tilt control 22 uses gauge wheels 50 or skids 52 (FIG. 3 only) that depend from or connect to opposite lateral ends 54 and 56 of header 24 with support apparatus 58. Each resilient support apparatus 58 is configured and operable to allow the associated wheel 50 or skid 52 to contact and move along the ground surface and follow the contour thereof, and to carry or support a portion of the weight of the associated lateral end 54 or 56 if desired. Each apparatus 58 is also configured and operable to allow some limited upward and downward relative movement of the wheel or skid and the associated lateral end 54 or 56 of the header, as will be explained.

Figure 4:
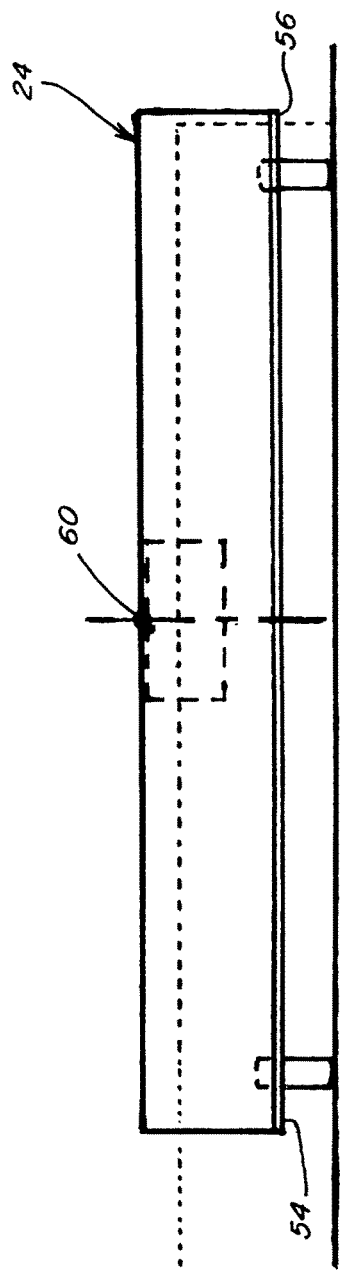
FIG. 4 is a simplified schematic front view of the header of the machine of FIG. 1, shown in at a zero lateral tilt angle, on a flat ground surface.
Figure 5:
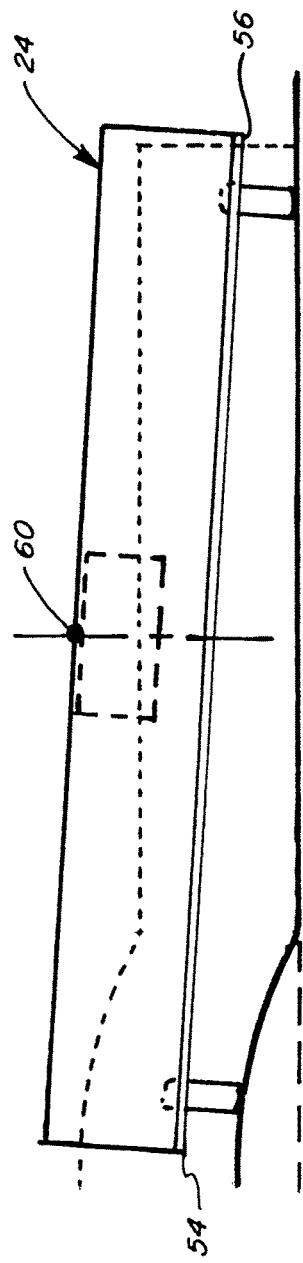
FIG. 5 is another simplified schematic front view of the header, shown laterally tilted at a representative angle for traversing an uneven ground surface.

Header 24 is pivotally connected by a pivot joint 60, or other suitable connection, to its supporting structure, here feeder 46, to allow lateral relative tilting about a pivotal axis through joint 60, a non-limiting example of an angle of tilt being illustrated in FIG. 5. Lateral tilt control 22 includes a tilt actuator 62 controllably operated by controller 38 via control signals outputted over a suitable communications path 64 to valve block 36 for controlling fluid flow to and from actuator 62 via fluid lines 66. Here, tilt actuator 62 comprises a hydraulic cylinder connected between header 24 and the front end of feeder 46, in offset relation to joint 60. With actuator 62 positioned and connected as explained, extension of actuator 62 will raise lateral end 56 and lower end 54, and retraction will raise end 54 and lower end 56, as shown in FIG. 5, in the well known manner. A zero tilt or level position is shown in FIG. 4.

Lateral tilt control 22 can operate automatically, e.g., via programmed control by controller 38 as a function of one or more monitored or sensed conditions, namely, heights of ends 54 and 56, or a difference therebetween, as sensed by suitable height or position sensors 68, and/or ground sensors 70, associated with the respective ends, or by inputted commands, e.g. from an operator controlled input device 72. Sensors 68 and/or 70, and input device 72, are connected to controller 38 over suitable communication paths 64 and are operable for outputting signals thereto, all in the well known conventional manner. As an automatic operational example, if controller 38 determines that one end 54 or 56 is lower or closer to the ground surface, it will command an appropriate responsive tilt movement, to correct the difference, with the objective to achieve or maintain a desired generally uniform height of cut H across the width of the header. However, there will be some expected time lag in the response, for receiving sensor signals, processing, and actuating the actuator, as in the case of known tilt control systems, and the lag will be more significant at higher travel speeds and with wider headers.

Here it should be noted that the tilt control will typically be configured to operate in cooperation with a header height control (not shown) configured and operable in a well known manner to set height H of the center of header above the ground surface, utilizing a suitable actuator or actuators, e.g. a hydraulic lift cylinder or cylinders, for lifting the front end of feeder 46 and thus header 24. The height control can be automatically controlled via a suitable controller such as, but not limited to, controller 38, and also operator commands, e.g. inputted via input device 72, or the like. In this regard, with both the tilt control and the height control operating in automatic mode, the controller or controllers can determine from inputted signals if a height command, tilt command, or both should be outputted to the appropriate actuator or actuators, again, all in the well known manner. It should be recognized and understood that this is just a general description of header lateral tilt and height controls, and that a variety of different configurations of such systems can be used with the system and method of the invention, such as those presently commercially available from Case IH, New Holland, Deere and Company, and others.

The system and method of the invention strives to substantially reduce or eliminate response lag and improve lateral tilt operation, particularly for wider headers operated at high ground travel speeds. This improved operational capability is achieved by bypassing the lateral tilt control to allow header 24 to at least substantially free float about pivot joint 60, lateral tilting movements being made responsive to the ground contour following capability of gauge wheels 50 or skids 52. As a result, response lag problems of system control are essentially eliminated. In the free float mode, the resiliency characteristic of relative up and down movements of the gauge wheels or skids and lateral ends 54 and 56 can be controlled by controller 38 via changing a parameter or parameters of variable resilient elements 80, which here comprise, but are not limited to, pressure in hydraulic accumulators, either independently, or jointly, with pressure feedback provided by pressure sensors 82 in connection with elements 80 or another suitable location in the fluid system.

As a result, in operation, if the frequency of tilting actions is too high, e.g., the header is oscillating or the like, such as, for instance, can result from both ends of the header being heavily loaded with cut plants, the resiliency of support apparatus 58 of both ends can be changed, e.g., by increasing the pressure in both variable resilient elements 80 to essentially provide a less resilient or firmer response. As another example, if the ground surface is rough, e.g., furrowed, so that undesired high frequency oscillation is occurring, the pressures in the accumulators can be adjusted to achieve desired control of movements, in both examples, without activating the tilt control (this can also be useful to create a different shock damping response from soil to header up/down). As still another example, if one end of the header is more heavily laden with cut plants, so that a weight imbalance is present and that end tends to be lower, pressure in variable resilient element 80 of that end can be increased to achieve even height. Representative examples of other variable resilient elements can include alone or in combination, springs having variable pretension or spring rate, e.g., via an inflatable bladder, or a hydraulic choke valve with variable orifice size, as non-limiting examples.

In each of the above operational examples, the variable parameter of parameters of the resilient elements, in this embodiment being accumulator pressure, can be individually automatically controlled to achieve desired ground following capability and uniformity of cut height, as a function of monitored conditions, namely, height of the respective ends as sensed by sensors 68 and/or 70, differences between the sensed heights, and/or weight or load (monitored as pressure) on the ends 54 and 56, individually or as an imbalance condition, as sensed by pressure sensors 82. Changes in the accumulator or operating pressure or pressures (pretension or spring rate, orifice size, etc. in other variable resilient elements) can be made instantaneously, e.g., in an active operating mode, responsive to arising condition, and/or based on trends or histories, or can be passively controlled, as desired or required for satisfactory operation.

At times, it is anticipated that conditions will arise where free float operation will not provide the desired control of tilt, and the tilt control will be activated. To enable rapid transition between the free float and tilt control modes, control 22 or electro-hydraulic system 34 will be configured to allow quickly de-activating or bypassing tilt control 22, and reactivating it, under command of controller 38. Here, a bypass valve 84 is incorporated into the electro-hydraulic system 34, in particular, in or with valve block 36, although it should be understood that other suitable locations of the bypass valve, or other configurations for deactivating the tilt control can be used, without limiting the present invention. In regard to the configuration and manner of operation of bypass valve 84, as a non-limiting example, for use with a tilt actuator 62 that is a fluid cylinder such as that shown, it can be configured to allow passage of fluid between the rod and piston end chambers of the fluid cylinder to allow substantially free extension and retraction of the cylinder rod. When bypass valve 84 is activated, tilt actuator 62 is allowed to freely extend and retract, thus allowing free tilting movements of the header.

Advantageously, the position of tilt actuator 62 will correspond to the actual angle of tilt of the header, and information representative of that position can be provided by a tilt sensor 86 to controller 38, via a suitable communication path 64, and can be used both during tilt control and free float operation.

Figure 6:
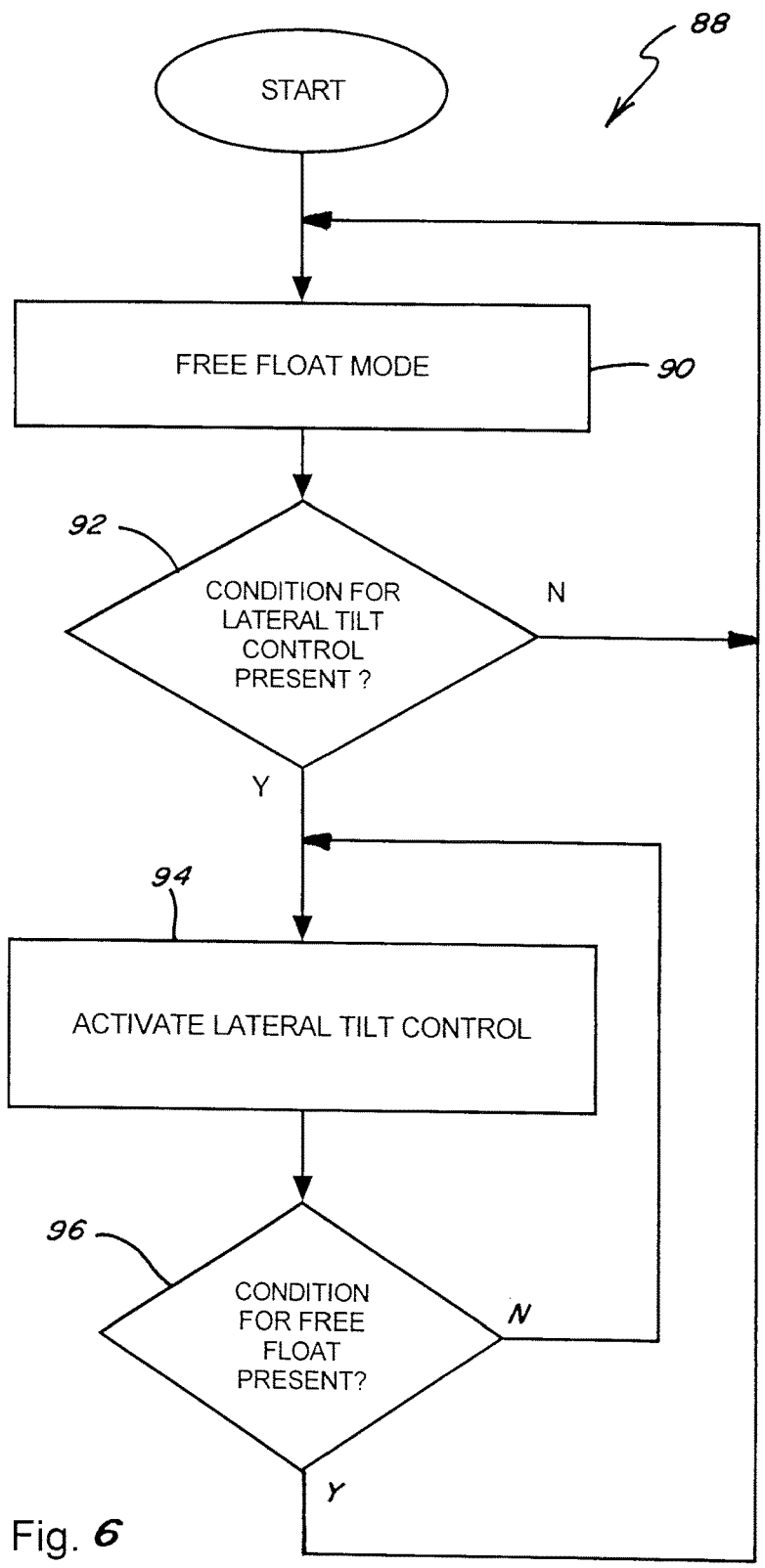
FIG. 6 is a high level flow diagram showing steps of a method of the invention.

Referring in particular to FIG. 6, a high level flow diagram 88 including steps of a method of operation of the system of the invention is shown. At block 90, the system is operating in the free float mode. In the free float mode, certain predetermined conditions for activating tilt control 22 are monitored by controller 38, as denoted by decision block 92. These conditions can variously include the height of the respective lateral ends 54, 56, as sensed by sensors 68 and/or 70, and/or a difference between the heights, and/or a weight imbalance, as computed by controller 38 or another processor. If at decision block 92, a condition or conditions for tilt control are not present, operation in the free float mode is continued and the process loops back to blocks 90 and 92. If at block 92 it is determined that a condition or conditions for lateral tilt control is/are present, controller 38 will activate the lateral tilt control 22, as denoted by block 94.

An exemplary condition or conditions for activating the tilt control can include a height difference determined or evaluated as not corrected or correctible by adjusting resiliency or pressure in either or both resilient support apparatus 58 in the above described manner; a sudden height difference such as can arise from contact of wheels 50 or skids 52 with an abrupt ground contour change or feature; and/or a weight imbalance, e.g., resulting from cutting of a denser or taller stand of plants, or a lowering of one end of the header to such an extent that achieving even height and uniform cut is not possible. In this latter regard, a lower height of cut of one end of the header can result in greater weight of cut plants on that end, resulting in uncorrectable tilt in the free float mode, and necessitating operation at least temporarily in the tilt control mode.

In the tilt control mode, because the above-discussed response lag problems can arise, it is desirable to change back to the free float mode when conditions are suitable. So, controller 38 monitors certain predetermined conditions that indicate acceptable free float operation. As a non-limiting general example, if a weight imbalance condition necessitating operation in the controlled tilt mode has been corrected, or is not present, and heights of the ends of the header are about even, the tilt control can be bypassed and free tilt allowed, the process looping back to block 90. If the condition or conditions for operation in the free tilt mode are not present, controller 38 will remain in the tilt control mode and loop back to block 94 to actively control tilt and continue monitoring conditions.

As an optional feature, electro-hydraulic system 34 can be configured to automatically provide some limited operation of lateral tilt control 22, as a non-limiting example, bypass valve 84 can be variably operable, e.g., a proportionally controlled valve, so that it can be partially closed to a variable extent, to provide desired operating characteristics in the tilt control mode, and also to provide some restriction of the free tilting of header 24 in the free float mode. As an operational example, this may be done when free float results in high frequency oscillations such as when traversing ground features such as furrows. As another optional feature, the system when in the free float mode can be configured to automatically activate the tilt control when the header is raised to a certain extent, such as occurs when initiating a turn in the headlands, exiting a field and the like. In regard to operation, it should be understood that the system and method of the invention have utility both when the header is set to a height close to or on the ground, e.g, harvesting legumes such as soybeans, and when at a set height above the ground, such as when harvesting wheat. And, at any time, a particular angle of tilt can be set using an input device such as device 72, to override both the free float and tilt control modes.

In light of all the foregoing, it should thus be apparent to those skilled in the art that there has been shown and described a header tilt control with automatic operation in free float and tilt control modes. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A method of controlling lateral tilt of a header carried on an agricultural harvesting machine, comprising steps of:
    operating an automatic lateral tilt control in connection with the header, the automatic lateral tilt control configured, in a tilt control mode, to automatically hold the header at varying lateral tilt angles relative to the harvesting machine, and, in a free float mode wherein the automatic lateral tilt control is bypassed, to allow substantially free lateral tilting of the header relative to the harvesting machine, the header comprising gauge wheels or skids connected to opposite lateral ends of the header, the gauge wheels or skids respectively contacting and following contours of a ground surface below the lateral ends of the header as the header travels over the ground surface and to allow limited resilient upward and downward relative movements of the gauge wheels or skids and the lateral ends, the header further comprising at least one sensor providing a signal indicative of a sensed height above the ground surface of at least a portion of the header;
    moving the harvesting machine over the ground surface with the gauge wheels or skids in contact with and following contours of the ground surface and the lateral tilt control bypassed in the free float mode;
    monitoring at least one predetermined condition based on the sensed height above the ground surface of the portion of the header for operation in the tilt control mode when in the free float mode, and:
        i. if the at least one condition is absent, then continuing operating in the free float mode; and
        ii. if the at least one condition is present, then automatically activating the control to operate in the tilt control mode; and
    monitoring at least one predetermined condition based on the sensed height above the ground surface of the portion of the header for operation in the free float mode when in the tilt control mode, and:
        i. if the at least one condition for operation in the free float mode is absent, then continuing operating in the tilt control mode; and
        ii. if the at least one condition for operation in the free float mode is present, then automatically bypassing the control and operating in the free float mode.

2. The method of claim 1, wherein the at least one condition for operation in the tilt control mode comprises a value representative of a height of at least one of the lateral ends of the header.

3. The method of claim 1, wherein the at least one condition for operation in the tilt control mode comprises a value representative of a difference between heights of the lateral ends of the header.

4. The method of claim 1, wherein the at least one condition for operation in the tilt control mode comprises a value representative of weights or loads on the lateral ends of the header, respectively.

5. The method of claim 1, wherein the at least one condition for operation in the tilt control mode comprises a value representative of a load imbalance on the lateral ends of the header.

6. The method of claim 1, wherein the at least one condition for operation in the free float mode comprises a value representative of relative heights of the lateral ends of the header.

7. The method of claim 1, wherein the at least one condition for operation in the free float mode comprises a value representative of a balance between pressures or loads on the lateral ends of the header, respectively.

8. The method of claim 1, wherein the step of moving the harvesting machine over the ground surface further comprises a step of monitoring for presence of at least one predetermined condition affecting the limited resilient upward and downward relative movements of the gauge wheels or skids and the lateral ends, and, if the at least one predetermined condition is present, then changing a characteristic of the upward and downward relative movements.

9. The method of claim 8, wherein the characteristic comprises resiliency of an apparatus controlling the upward and downward relative movements.

10. The method of claim 1, wherein the step of moving the harvesting machine over the ground surface further comprises monitoring for presence of at least one predetermined condition associated with the limited resilient upward and downward relative movements of the gauge wheels or skids and the lateral ends, and if the at least one associated predetermined condition is present, then changing an operating characteristic of the free float mode.

11. The method of claim 10, wherein the operating characteristic comprises a resistance to lateral tilting movements of the header.

12. A system for controlling lateral tilt of a header carried on an agricultural harvesting machine, comprising:
    a lateral tilt control in connection with the header, the lateral tilt control configured, in a tilt control mode, to automatically hold the header at varying lateral tilt angles relative to the harvesting machine, and, in a free float mode wherein the control is bypassed, to allow substantially free lateral tilting of the header relative to the harvesting machine;
    gauge wheels or skids connected to opposite lateral ends of the header, the gauge wheels or skids respectively configured to contact and follow contours of a ground surface below the lateral ends of the header as the header travels over the ground surface and to allow limited resilient upward and downward relative movements of the gauge wheels or skids and the lateral ends, respectively, the header further comprising at least one sensor providing a signal indicative of a sensed height above the ground surface of at least a portion of the header; and
    a controller configured to control the lateral tilt control, the controller configured to:
        bypass the lateral tilt control in a free float mode when the harvesting machine is moving over the ground surface with the gauge wheels or skids in contact with and following contours of the ground surface; and automatically monitor at least one predetermined condition based on the sensed height above the ground surface of the portion of the header for operation in the tilt control mode when in the free float mode, and:
  i. if the at least one condition is absent, then to continue operation in the free float mode; and
  ii. if the at least one condition is present, then automatically to activate the lateral tilt control to operate in the tilt control mode; and automatically monitor at least one predetermined condition based on the sensed height above the ground surface of the portion of the header for operation in the free float mode when in the tilt control mode, and:
  i. if the at least one condition for operation in the free float mode is absent, then to continue operation in the tilt control mode; and
  ii. if the at least one condition for operation in the free float mode is present, then automatically to bypass the lateral tilt control to operate in the free float mode.

13. The system of claim 12, wherein the at least one condition for operation in the tilt control mode comprises a value representative of a height of at least one of the lateral ends of the header.

14. The system of claim 13, wherein the at least one condition for operation in the tilt control mode comprises a value representative of a difference in heights of the lateral ends of the header.

15. The system of claim 12, wherein the at least one condition for operation in the tilt control mode comprises a pressure or load condition.

16. The system of claim 15, wherein the at least one condition for operation in the tilt control mode comprises a value representative of a load imbalance acting on the header.

17. The system of claim 12, wherein the at least one condition for operating in the free float mode comprises a value representative of a height of a lateral end of the header.

18. The system of claim 12, wherein the at least one condition for operating in the free float mode comprises a balance between pressures or loads associated with the lateral ends of the header, respectively.

19. The system of claim 12, wherein the lateral tilt control is further configured to monitor, when the harvesting machine is moving over the ground surface, for presence of at least one predetermined condition associated with the limited resilient upward and downward relative movements of the gauge wheels or skids and the lateral ends, and, if the at least one predetermined condition is present, then to change an operating characteristic of the upward and downward relative movements.

20. The system of claim 19, wherein the operating characteristic comprises a resistance to lateral tilting movements of the header.

21. The system of claim 12, wherein the lateral tilt control comprises a hydraulic system and a bypass valve for bypassing the hydraulic system for operation in the free float mode.

22. The system of claim 21, wherein the bypass valve is proportionally operable.

23. The system of claim 12, wherein the at least one sensor is a ground sensor.

* * * * *